US009201205B2

(12) United States Patent
Bunte (10) Patent No.: US 9,201,205 B2
(45) Date of Patent: Dec. 1, 2015

(54) TELECOMMUNICATIONS CABLE INLET DEVICE

(71) Applicant: 3M INNOVATIVE PROPERTIES COMPANY, St. Paul, MN (US)

(72) Inventor: Robert W. Bunte, Georgetown, TX (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 132 days.

(21) Appl. No.: 14/132,594

(22) Filed: Dec. 18, 2013

(65) Prior Publication Data

US 2014/0199035 A1    Jul. 17, 2014

Related U.S. Application Data

(60) Provisional application No. 61/753,193, filed on Jan. 16, 2013.

(51) Int. Cl.
*G02B 6/44* (2006.01)
*G02B 6/38* (2006.01)

(52) U.S. Cl.
CPC ............... *G02B 6/44* (2013.01); *G02B 6/4439* (2013.01); *G02B 6/4495* (2013.01); *G02B 6/3878* (2013.01)

(58) Field of Classification Search
CPC ... G02B 6/3878; G02B 6/4495; G02B 6/4439
See application file for complete search history.

(56) References Cited

U.S. PATENT DOCUMENTS

| | | | | |
|---|---|---|---|---|
| 4,626,067 | A | * | 12/1986 | Watson ............................ 385/86 |
| 5,048,918 | A | * | 9/1991 | Daems et al. .................... 385/86 |
| 5,125,060 | A | * | 6/1992 | Edmundson ................. 385/100 |
| 6,487,344 | B1 | | 11/2002 | Naudin |
| 7,711,236 | B2 | * | 5/2010 | Gonzalez et al. .............. 385/137 |
| 7,756,374 | B2 | * | 7/2010 | Cody et al. ..................... 385/114 |
| 7,787,740 | B2 | * | 8/2010 | Kluwe et al. ................... 385/137 |
| 8,934,751 | B2 | * | 1/2015 | Simmons et al. .............. 385/137 |
| 2002/0064364 | A1 | * | 5/2002 | Battey et al. ................... 385/136 |
| 2008/0247720 | A1 | * | 10/2008 | Cody et al. ..................... 385/114 |
| 2008/0253729 | A1 | | 10/2008 | Gronvall |
| 2009/0045591 | A1 | | 2/2009 | Cailleaux |
| 2009/0060421 | A1 | | 3/2009 | Parikh |
| 2010/0027955 | A1 | | 2/2010 | Parikh |
| 2011/0033157 | A1 | | 2/2011 | Drouard |

(Continued)

FOREIGN PATENT DOCUMENTS

WO    WO 2012/038104    3/2012

OTHER PUBLICATIONS

International Search Report for PCT/US2013/076452, mailed on Apr. 7, 2014, 3 pp.

(Continued)

*Primary Examiner* — Rhonda Peace (74) *Attorney, Agent, or Firm* — Janet A. Kling (57) ABSTRACT

The present invention relates to an inlet device for inserting a plurality of cables containing optical fibers, copper wires or coax cable into port of a telecommunications enclosure. In particular, the exemplary inlet device includes a breakout portion that can be connected to a conduit carrying at least one of the cables to enter the enclosure. Specifically, the inlet device includes housing having a first end and a second end, wherein the housing includes, a compression member attached to the second end of the housing and a break-out portion attached to the compression member.

11 Claims, 9 Drawing Sheets

(56) References Cited

U.S. PATENT DOCUMENTS

| | | | |
|---|---|---|---|
| 2011/0075983 A1* | 3/2011 | Fan et al. | 385/135 |
| 2013/0294738 A1 | 11/2013 | Simmons | |
| 2014/0133823 A1* | 5/2014 | Simmons et al. | 385/137 |
| 2014/0199035 A1* | 7/2014 | Bunte | 385/100 |

OTHER PUBLICATIONS

U.S. Appl. No. 13/675,684, filed Nov. 13, 2012, entitled "Telecommunications Cable Inlet Device".

* cited by examiner

TELECOMMUNICATIONS CABLE INLET DEVICE

FIELD OF THE INVENTION

The present invention relates to an inlet device for inserting a plurality of cables containing optical fibers, copper wires or coax cable into port of a telecommunications enclosure. In particular, the exemplary inlet device includes a breakout portion that can be connected to a conduit carrying at least one of the cables to enter the enclosure.

BACKGROUND OF THE INVENTION

Telecommunication cables are ubiquitous and used for distributing data across vast networks. The majority of cables are electrically conductive cables (typically copper), although the use of optical fiber cables is growing rapidly in telecommunication networks as larger and larger amounts of data are transmitted.

As telecommunication cables are routed across data networks, it is necessary to periodically open the cable so that one or more telecommunication lines therein may be spliced, thereby allowing data to be distributed to other cables or "branches" of the telecommunication network. At each point where a telecommunication cable is opened, it is necessary to provide a telecommunications enclosure to protect the exposed interior of the cable. The cable branches may be further distributed until the network reaches individual homes, businesses, offices, and so on.

In some installations, the telecommunication cables can be disposed in protective conduits to provide protection to the cables contained therein. When a protective conduit is used, environmental protection is needed between the interface between the terminal end of the conduit, the cables within the conduit and/or the port of the telecommunications enclosure into which the cables are entering. The situation can be further complicated when the same port needs to accommodate one or more additional cables that are not housed in the conduit.

Many conventional telecommunication enclosures utilize either a mastic or rubber grommets for introducing cables into the enclosure. Conventional inlet devices are described in U.S. Pat. No. 6,487,344 and U.S. Publication No. 2009-0060421-A1 which can be inserted into a port in the wall of a telecommunications enclosure.

SUMMARY OF THE INVENTION

The present invention relates to an inlet device for inserting a plurality of cables containing optical fibers, copper wires or coax cable into port of a telecommunications enclosure. In particular, the exemplary inlet device includes a breakout portion that can be connected to a conduit carrying at least one of the cables to enter the enclosure. Specifically, the inlet device includes housing having a first end and a second end, wherein the housing includes, a compression member attached to the second end of the housing and a break-out portion attached to the compression member.

In an exemplary aspect, the break out portion includes a first body section, a second body section attachable to the first body section to create an internal space through which communication cables can be passed and a conduit coupling. In addition, at least one of the first body section and the second body section of the break-out portion includes a central channel extending lengthwise along the at least one of the first body section and the second body section. The break-out portion can also further include at least one break-out channel that joins to the central channel at an oblique angle. The break-out channel is configured to allow an external cable to enter and pass through the exemplary inlet device.

The above summary of the present invention is not intended to describe each illustrated embodiment or every implementation of the present invention. The figures and the detailed description that follows more particularly exemplify these embodiments.

BRIEF DESCRIPTION OF THE DRAWINGS

The present invention will be further described with reference to the accompanying drawings, wherein.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION OF THE DRAWINGS

In the following detailed description of the preferred embodiments, reference is made to the accompanying drawings, which illustrate specific embodiments in which the invention may be practiced. The illustrated embodiments are not intended to be exhaustive of all embodiments according to the invention. It is to be understood that other embodiments may be utilized and structural or logical changes may be made without departing from the scope of the present invention. The following detailed description, therefore, is not to be taken in a limiting sense, and the scope of the present invention is defined by the appended claims.

Evolving requirements for increased data capability to support "smartphones" are driving the implementation of distributed radio systems with power amplifiers and radios mounted on the tower. This architecture is more power-efficient and permits more RF connections from the remote radio unit (RRU) to the antenna. This, in turn, enables advanced antennas such as Multiple In Multiple Out (MIMO) antennas to be utilized to gain the requisite signal-to-noise ratio required to support very high bandwidth LTE/4G mobile services. In most cases, the RRU is fiber-fed with digital communication protocols. In addition, placing the RRUs on the towers requires that a power (electrical) line be provided to each RRU.

In fourth generation (4G) wireless communication systems, the remote radio units are being deployed up on the tower near the antennas. Direct Current (DC) power and surge/circuit protection are required when placing the remote radio head up on the tower. In addition, 4G networks typically rely on fiber optic media to carry the high bandwidth data traffic. The interconnection points for the power cables, surge/circuit protection, and fiber optic cables need to be protected from the environment in a telecommunication enclosure such as the telecommunication enclosures described in U.S. Patent Publication No. 2013-0294738, which is incorporated by reference herein, in its entirety.

In some installations, the telecommunication cables may be required to be disposed in protective conduits to provide protection to the cables contained therein. The protective conduit can serve both to identify the cable run as an optical fiber cable run as well as to protect the cable from damage due to environmental stress (such as falling ice) and physical stress (such as compression under the feet of a tower worker). Although the power cable to a Remote Radio Unit on a tower follows the same general path as the fiber optic feed, regulations may require the power cable to be segregated away from the fiber cable and not run in the same protective conduit as the fiber cable.

In these instances, a weather sealing means is required to express the power cable out of the protective conduit or conduit fitting while permitting the fiber cable to maintain a weather sealed condition inside the conduit. Thus, there is a need for environmental protection at the interface between the terminal end of the conduit, the fiber optic cables disposed within the conduit and/or the port of the telecommunications enclosure into which the cables are entering. The situation can be further complicated when the same port needs to accommodate one or more additional cables that are not housed in the conduit, such as an external power cable. To accommodate this architecture on a cell tower, an exemplary inlet device having a cable break out portion has been created and is disclosed herein.

The expense of space on a cell tower to a provider is generally determined by the size and number of components disposed on the cell tower. Generally in cell tower installation as shown schematically in FIG. 1A, a distribution cable 20 (e.g. a hybrid cable comprising a plurality of optical fibers and at least two electrical conductors) for carrying communication signals and power can be routed from a base station, site support cabinet or cell tower terminal enclosure 30 on or near ground level up the tower to a telecommunication enclosure or cell tower enclosure 50 near the remote radio units 60 and corresponding antennas 70 which can be located over a hundred feet in the air. Alternatively, separate optical fiber and power distribution cables may be routed up the cell tower.

Figure 1A:
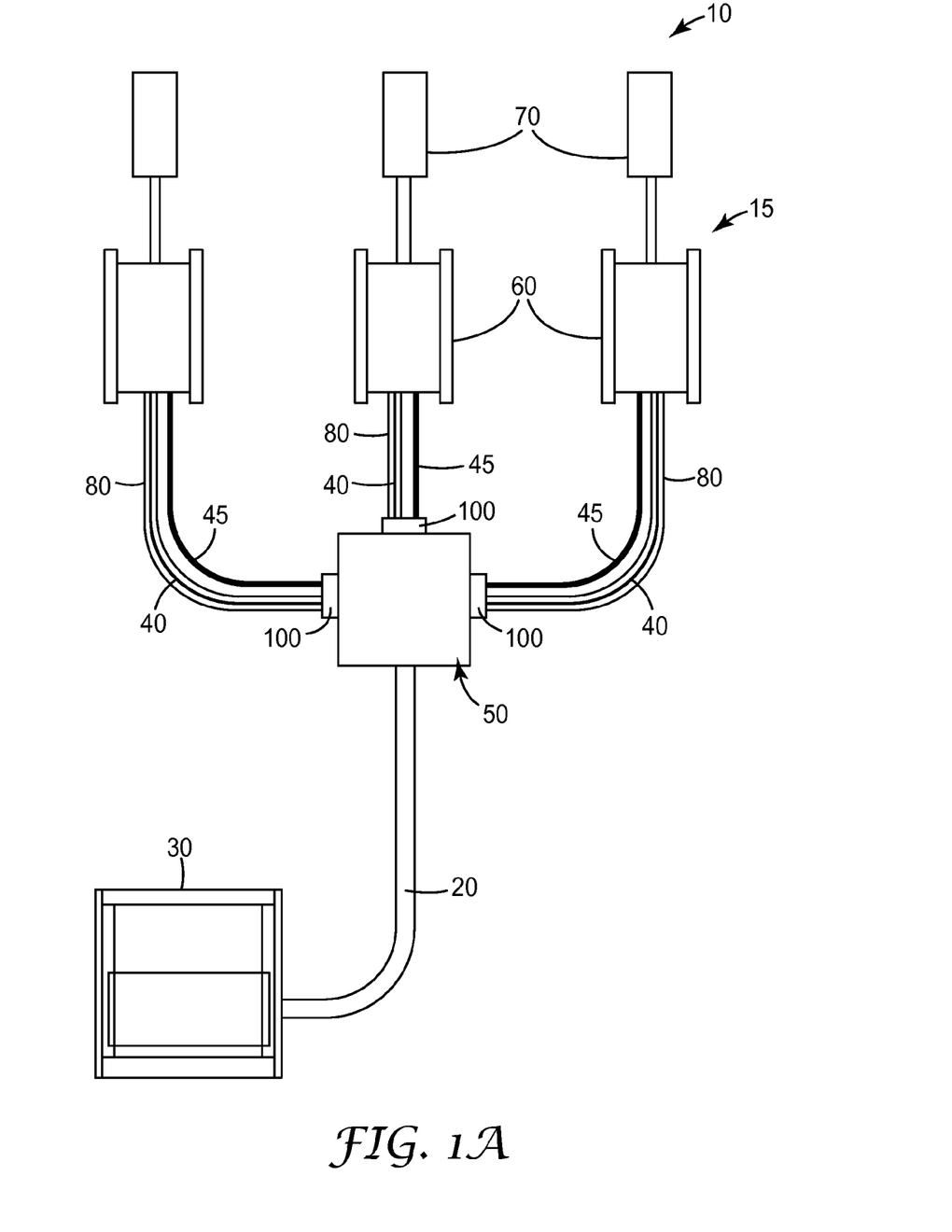
FIG. 1A shows a cell tower configuration that can utilize an exemplary inlet device according to an aspect of the invention.

Optical fiber jumper lines or cables 40 disposed in a protective conduit 80 and electrical jumper lines or cables 45 interconnect the cell tower enclosure 50 to the remote radio units 60. An exemplary inlet device 100 includes a cable break out portion that can enable the fiber optic lines contained within the protective conduit and the separate power lines to enter the cell tower enclosure through the same entry port. Feeding the optical fiber and power lines through the same entry port reduces the total number of entry ports required in the cell tower enclosure which in turn helps to minimize the size of the enclosure reducing lease fees that need to be paid for mounting the enclosure on the cell tower.

FIG. 1A is a schematic representation of a conventional cell tower 10 having one tier 15 having three remote radio units 60 and three antennas 70. The equipment and antennas on each tier may belong to a separate telecommunication service provider. Each of the antennas in a given tier provides cell signal reception for about a 120° sector around the cell tower. Cell towers can include additional antenna tiers as well as additional antennas per tier as required for a particular network configuration. For example, each tier on a cell tower can have four antennas, each antenna providing cell signal reception for a 90° sector or six antennas, each antenna providing cell signal reception for a 60° sector. Increasing the number of antennas in a given tier can increase the signal carrying capacity of the tower.

Figure 1B:
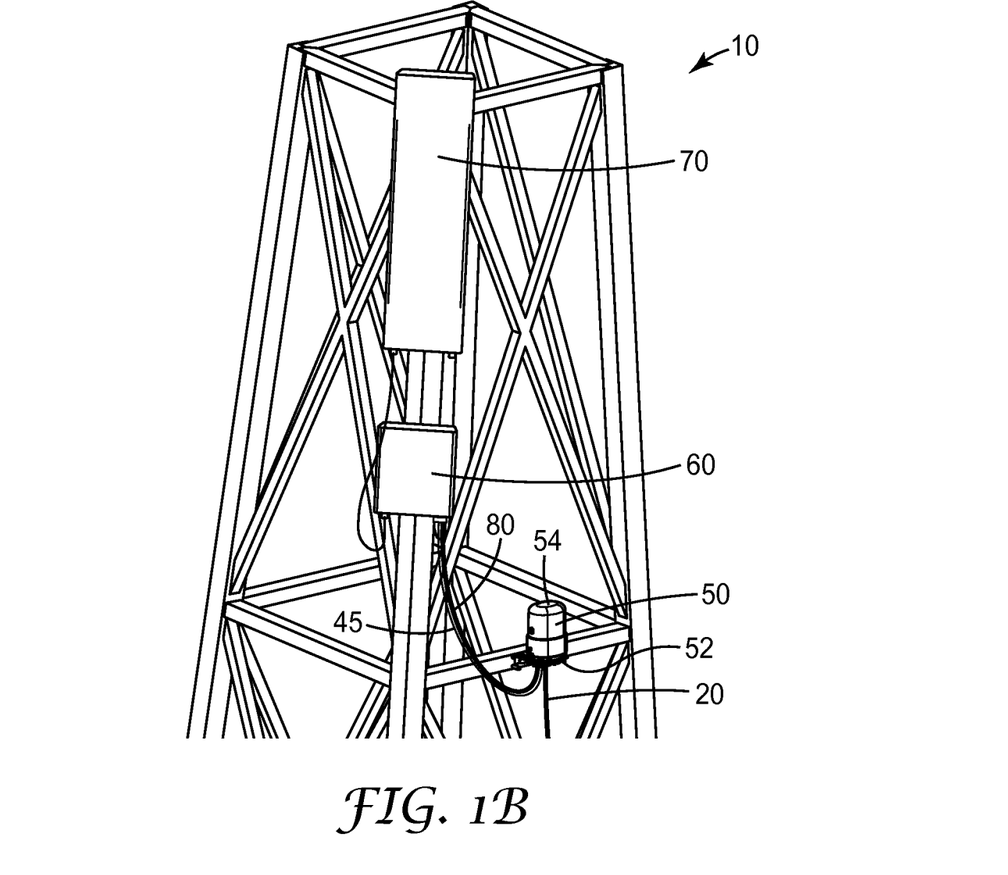
FIG. 1B is an isometric view showing a portion of a cell tower representation with a cell tower enclosure having an exemplary inlet device according to an aspect of the invention.

FIG. 1B shows an alternative representation of a cell tower 10 showing a cell tower enclosure 50 disposed near remote radio unit 60 and its corresponding antenna. The cell tower enclosures can be configured to provide an interconnection point for optical communication signals as well as DC power line connections or as a simple branch point for hybrid cables. The cell tower enclosures 50 can be configured to provide interconnections for a single remote radio unit 60 or for a plurality of remote radio units on a single tier of the tower.

Figure 2A:
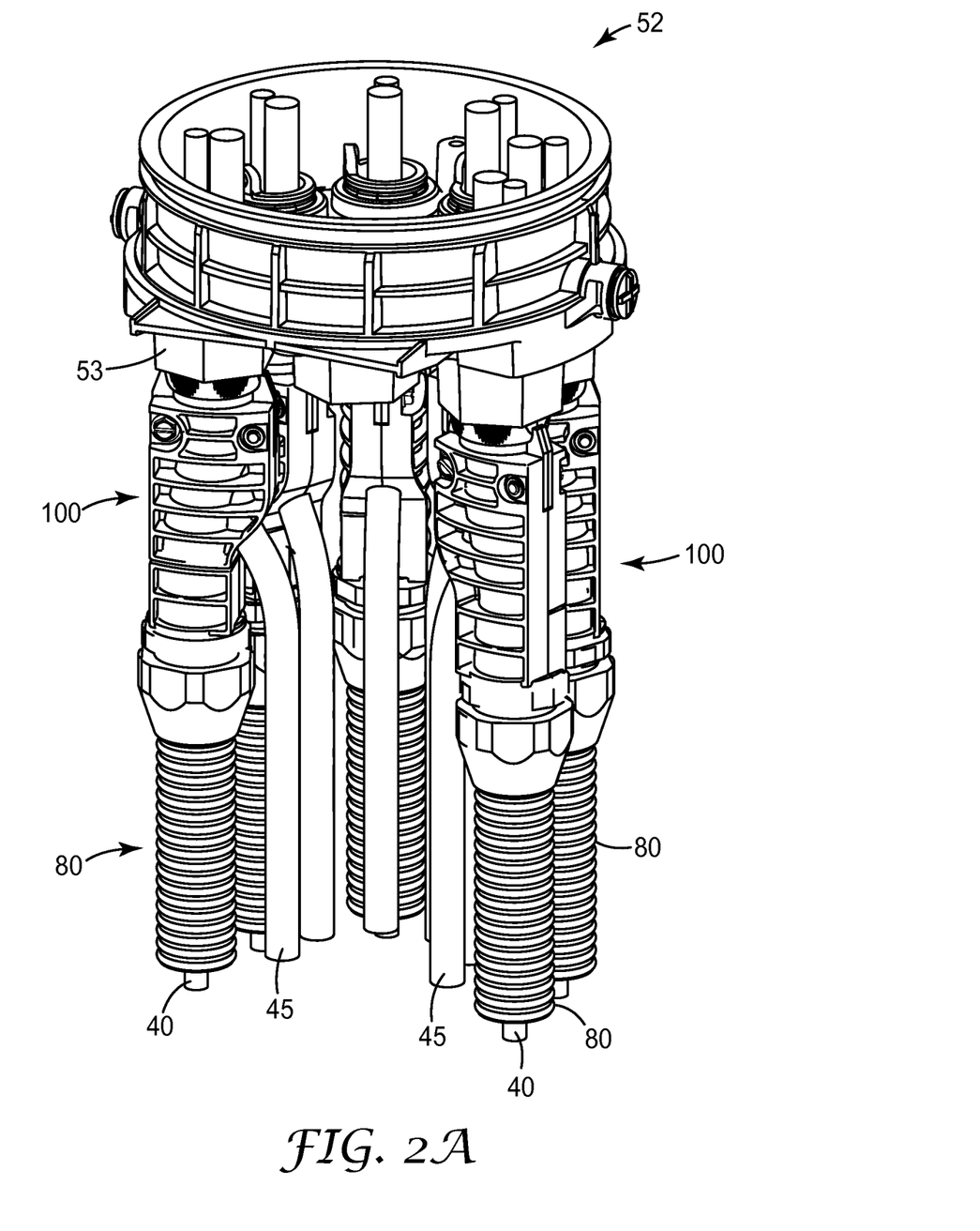
FIGS. 2A and 2B are two views of a base of a cell tower enclosure having an exemplary inlet device according to an aspect of the invention.
Figure 2B:
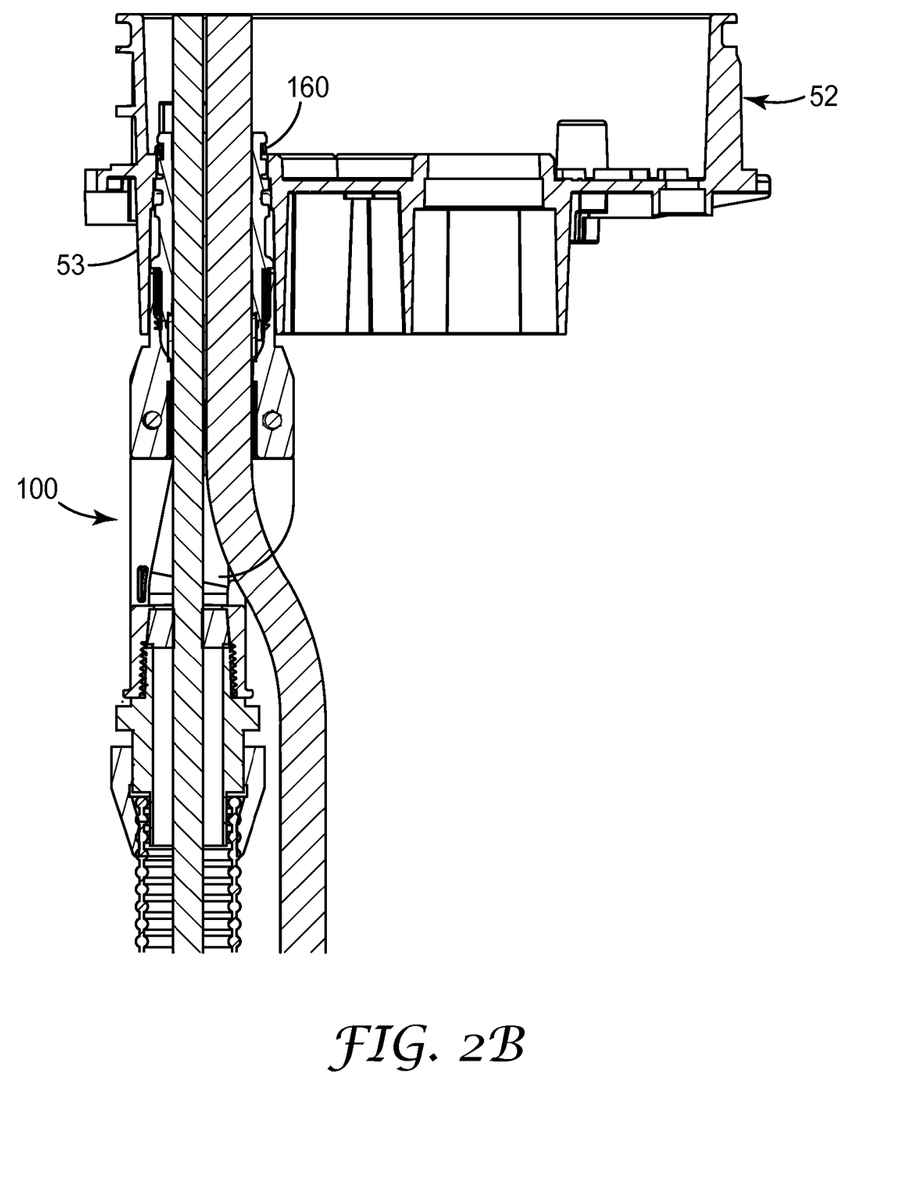

FIGS. 2A and 2B shows an exemplary inlet device installed in the base 52 of a cell tower enclosure 50 (FIG. 1B). The cell tower enclosure of FIG. 2B can be configured as an interconnection point or branching point for the optical signal and electrical power feeds for up to six remote radio units. The base 52 of the cell tower enclosure is shown with cover 54 (FIG. 1B) removed. The cover and the base of the cell tower enclosure are configured for engagement with each other to form a protective re-enterable enclosure. The cover can have a generally domed or bell-jar shape. While enclosure 50 is shown as having a generally elliptical dome construction, the enclosure may assume other shapes or configurations as are required for a particular application. Similarly, the base can have a substantially oval cross-section in the transverse direction that matches the shape of the open end of the cover. However, shape of the transverse cross-section of the cover and base may be substantially elliptical, rectangular, square, or any other shape as is required or desired for a particular application. The closed second end of the cover may likewise be any suitable shape.

Referring to FIGS. 2A and 2B, base 52 includes a plurality of ports 53 for receiving optical fiber cables, power cables and/or optical/electrical hybrid cables. The number of ports may vary depending on the specific network configuration on the tower (i.e. the number of remote radio units being served by the enclosure as well as by the type and number of cables entering and exiting the cell tower enclosure). The cable ports 53 disposed in base 52 can be round, elliptical, hexagonal or any other polygonal shape. For example, each remote radio unit can be served by two optical fibers and a pair of power conductors. Thus, the jumper lines can be individual jacketed cables each carrying a separate class of conductor (i.e. optical or electrical conductors). The optical fiber communication cables can be routed to the remote radio unit through a protective conduit while the generally more rugged power lines can be routed separately.

FIG. 2B is a cross-sectional view of an exemplary inlet device 100 secured within a port 53 in the base 52 of a cell tower enclosure 50 via the engagement of the retainer ring 160 with the inside lip of the port.

In an exemplary aspect, it is desirable to route the communication cables (i.e. optical cables and power cables) for a given remote radio unit through a single cable port 53 of the cell tower enclosure 50. To accomplish this, exemplary inlet device 100 can be inserted into a port in the enclosure to secure the telecommunication cable within the port as well as providing environmental protection to the transition region as the optical fiber cables exit the protective conduit and the entry of the power cable(s) into the inlet device.

In one exemplary embodiment, the communication cable can be a fiber optic cable, a low count copper cable (for communication or to supply power to equipment) disposed within the telecommunication enclosure, or a copper/fiber hybrid cable. Fiber optic cable may include a semi-rigid outer sheath surrounding at least one optical fiber and at least one strength member. The optical fibers may be enclosed in one or more loose buffer tubes. Each optical fiber has a polymeric coating that surrounds and protects the glass fiber. Examples of exemplary optical fiber cables include ResiLink ADF™ All-Dielectric Flat Drop Cable available from Pirelli Cables and Systems (Columbia, N.C.) or EZ DROP cable from Draka (Claremont, N.C.), and Mini DP Flat Drop Cable available from OFS (Northcross, Ga.). The optical fiber has a polymeric coating that surrounds and protects the glass fiber. The strength members may be either semi-rigid rods or a collection of loose fibers e.g. made of aramid fibers.

Alternatively, the telecommunication cable may be a low wire count copper cable having a semi-rigid sheath surrounding a plurality of paired copper wires or a copper coax cable. An exemplary copper cable for providing power to equipment inside of a telecommunication enclosure can include Power to the Antenna (PTTA) Power cables available from Huber+ Suhner Inc. (Switzerland). An exemplary copper/fiber hybrid cable can include a 50-AC-208-8SM Remote Fiber Feeder™ Hybrid Cable with steel armor available from Alliance Corporation (Mississauga, Ontario).

An exemplary inlet device 100 of the present invention will be described in more detail in reference to FIGS. 3A-3C and FIGS. 4A-4B. Inlet device 100 includes a housing 110 having a first end 111 and a second end 112, an sealing member 140 shaped to be received within the second end of the housing, a compression member attachable to the second end of the housing and a break-out device 180 attached to the second end of the compression member. In an exemplary aspect, the compression member can be a clamping nut 150 or other device capable of applying a radial force to the second end of the inlet device housing. The inlet device 100 may be formed of plastic by conventional methods, for example by injection molding.

Figure 3A:
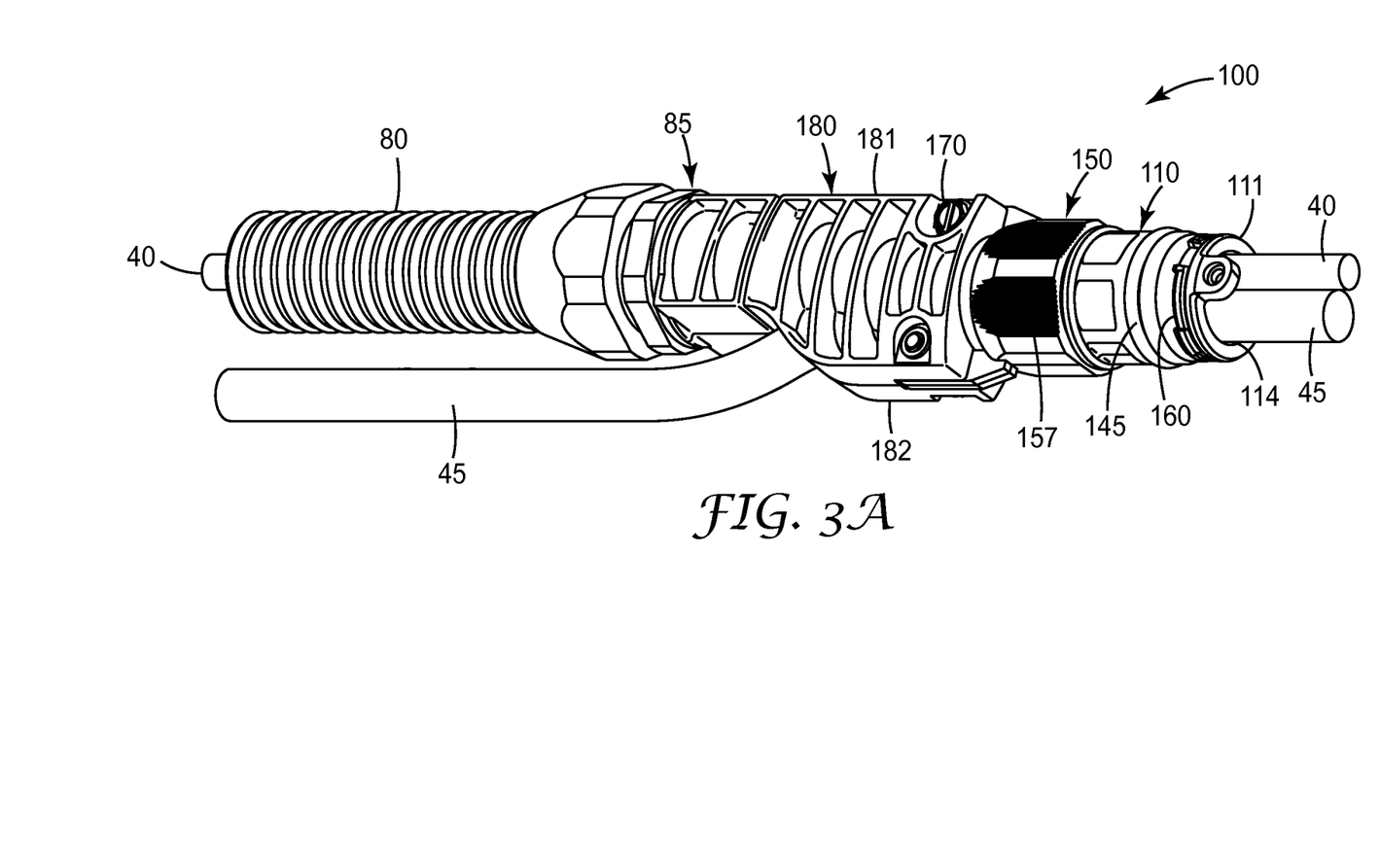
FIGS. 3A-3C show three views of an exemplary inlet device according to an aspect of the present invention.
Figure 3B:
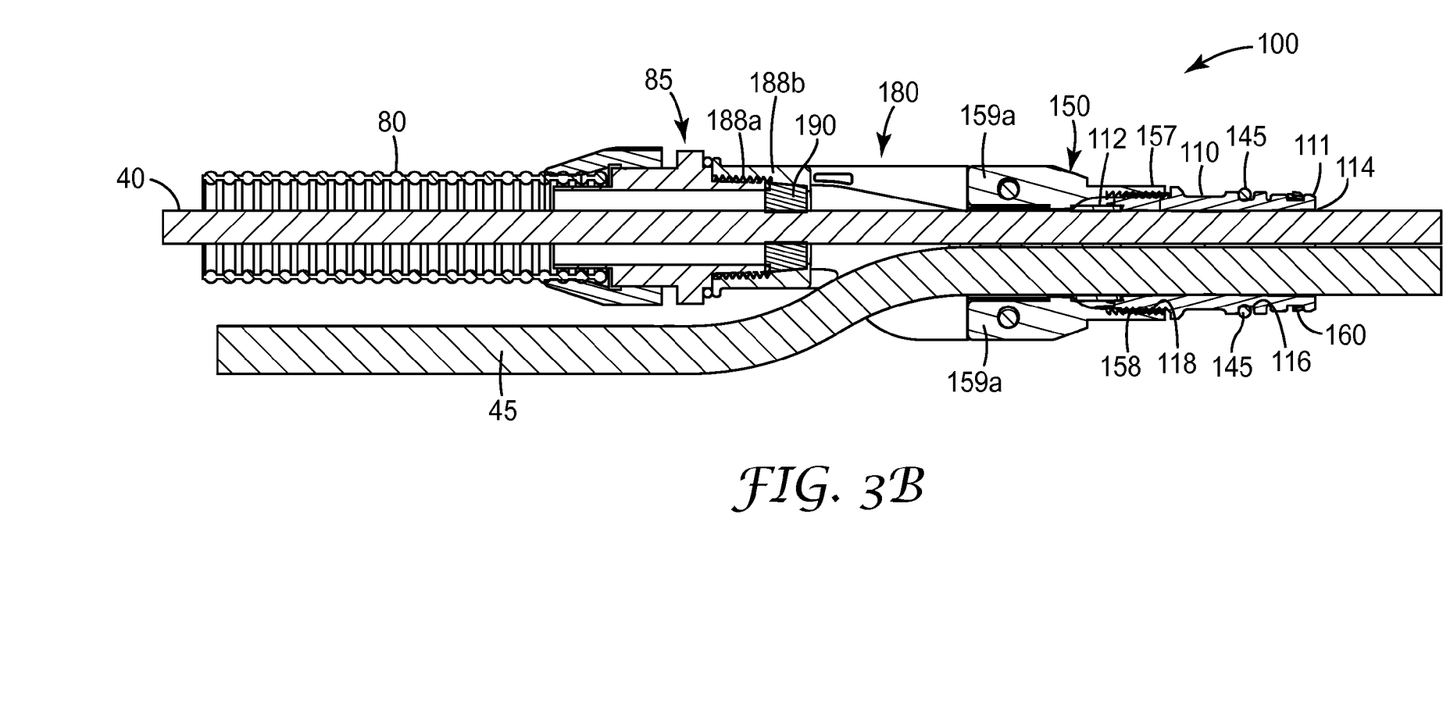
Figure 3C:
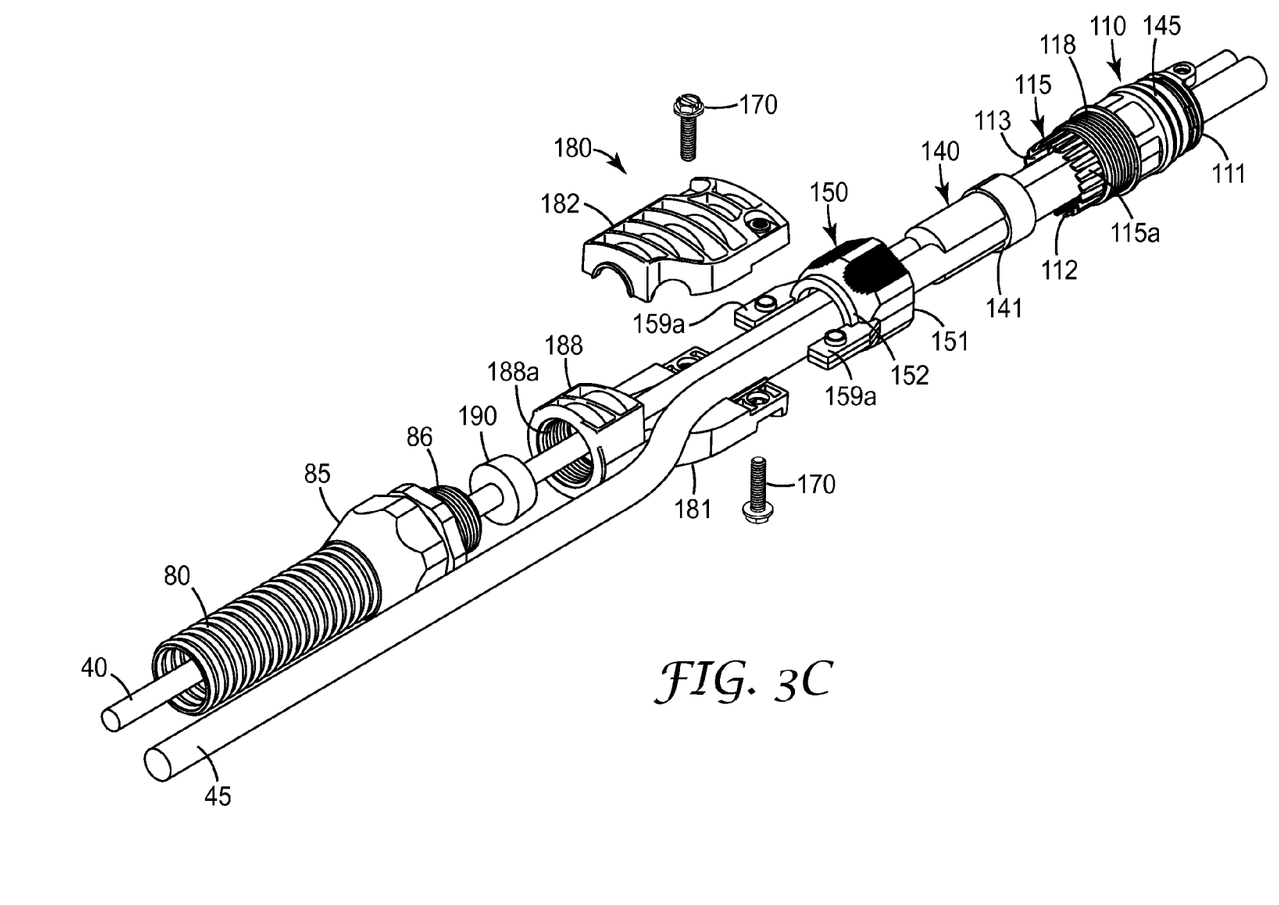

The housing may be generally cylindrical in shape and includes an interior passageway that extends along the length of the housing from the first end 111 to the second end 112 of the housing. The housing includes a passage entry 114 at the first end 111 of the interior passageway and a passage exit 113 at the second end 112 of the interior passageway. The interior passageway can be configured to accommodate certain categories of telecommunication cables including single fiber drop cables, multi-fiber cables, copper communication cables, power cables, hybrid copper fiber cables or coax cables.

The first end of the housing will reside inside a telecommunication enclosure when the inlet device has been fully inserted into a port of the telecommunication enclosure. The second end of the housing may be located within the port of the telecommunication enclosure when the inlet device has been fully inserted into a port of a telecommunication enclosure. Alternatively, the second end of the tubular body may extend completely through the port of the telecommunication enclosure.

A groove 116 may be disposed on the external surface of housing 110 between the first end 111 and the second end 112 of the housing to receive an external sealing member 145, such as an o-ring. This external sealing member can provide an environmental seal between the inlet device and the port of a telecommunication enclosure when the inlet device is fully seated therein.

In addition, the housing can have a channel formed in the external surface of housing 110 near the first end 111 of the inlet device's housing. The channel is configured to receive a retainer clip 160 for securing the inlet device into the port of a telecommunication enclosure during insertion, thus eliminating the need for a separate locking mechanism. An exemplary retainer clip is described in U.S. patent application Ser. No. 13/675,684, which is incorporated by reference herein, in its entirety.

The housing 110 can have an external threaded portion 118 located between groove 116 and the second end 112 of the housing 110. The external threaded portion 118 cooperates with a corresponding internal threaded portion 158 of a the clamping nut 150 to cause a compressible portion 115 of the housing 110 to conform to an outer surface of the communication cable or the outer surface of an optional internal sealing member 140 fitted in the inlet device.

The compressible portion 115 is formed at the second end 112 of the housing. The compressible portion 115 may be reduced in size (diameter) when an external radial force is exerted on it such as by application of a clamping nut 150. The compressible portion 115 can center the telecommunication cable(s) and/or it can exert a compression force on an internal sealing member, if used, when the inlet device 100 is installed on the telecommunication cable. The compressible portion 115 may include a plurality of spaced apart flexible fingers 115a which surround the passage exit. The fingers 115a may be squeezed together when clamping nut 150 is attached to the second end of the housing.

Sealing member 140 can be fitted at least partially into the interior passageway in the second end 112 of the housing of the housing 110 to improve the sealing capability of the inlet device around a telecommunication cable. The sealing member can have one or more bores extending therethrough to accommodate telecommunication cables (optical, copper or power cables). In one exemplary aspect, the sealing member can have a slit extending from the outside surface of the sealing member into each bore to allow installation of telecommunication cables without having to thread them through the bores. The sealing member can have a constant outer diameter or it can have a stepped outer diameter. In an exemplary aspect, the stepped external profile 141 can allow the second end of the sealing member to extend through compression nut 150, as shown in FIG. 3C, enabling a longer sealing member to be used which can help strain relieve the telecommunication cable(s) exiting the second end of the inlet device. The number, size and shape of the bores through the sealing member can be altered to accommodate different cable geometries.

Exemplary sealing member 140 may be formed from, for example, elastomeric and polymeric materials, such as thermoplastic elastomers, vulcanite rubbers, polyurethane foams, reactive and non-reactive polymers, and soft plastics, to name a few. Material selection will depend upon factors including, but not limited to, material durometer, chemical and environmental exposure conditions including temperature and humidity conditions, and flame-retardancy requirements, to name a few.

The telecommunication cable can be passed through the sealing member 140 when the cable is installed into inlet device 100. The tightening of the clamping nut 150 over the collapsible portion of the housing compresses the sealing member. In some applications such as in premise installations, a lesser degree of environmental protection is required and sealing member 140 may be omitted.

Exemplary cable clamping nut 150 has an interior chamber extending between the first side 151 and a second side 152. The interior chamber has a first opening at the first side 151 to accept the second end 112 of housing 110. The chamber has a smaller second opening at the second side 152 of cable clamping nut 150 to accommodate the passage of a portion of sealing member 140 and the communication cables therethrough. The chamber has an internal threaded portion 158 that can correspond to the external thread 118 on the second end of the housing to allow the cable clamping nut to be secured to the housing.

In an exemplary embodiment, cable clamping nut 150 can further include a gripping surface 157 on the external surface of the cable clamping nut that corresponds to the position of the internal threaded portion 158. The external gripping surface may be a hexagonally shaped cross-section to facilitate gripping of the cable securing device with a tool or by hand. The external gripping surface can have other geometric configurations such as a circular cross-section, a rectangular cross-section or other polygonal cross-section. Additionally, the gripping surface may be textured (e.g. a ridged or cross-hatched texture) to further facilitate gripping of the cable securing device.

The cable clamping nut 150 includes two longitudinal side tabs 159a that project from the second end 152 of clamping nut 150. The break-out portion 180 can be secured to the longitudinal side tabs by conventional mechanical fasteners 170 such as by screws or rivets.

Figure 4A:
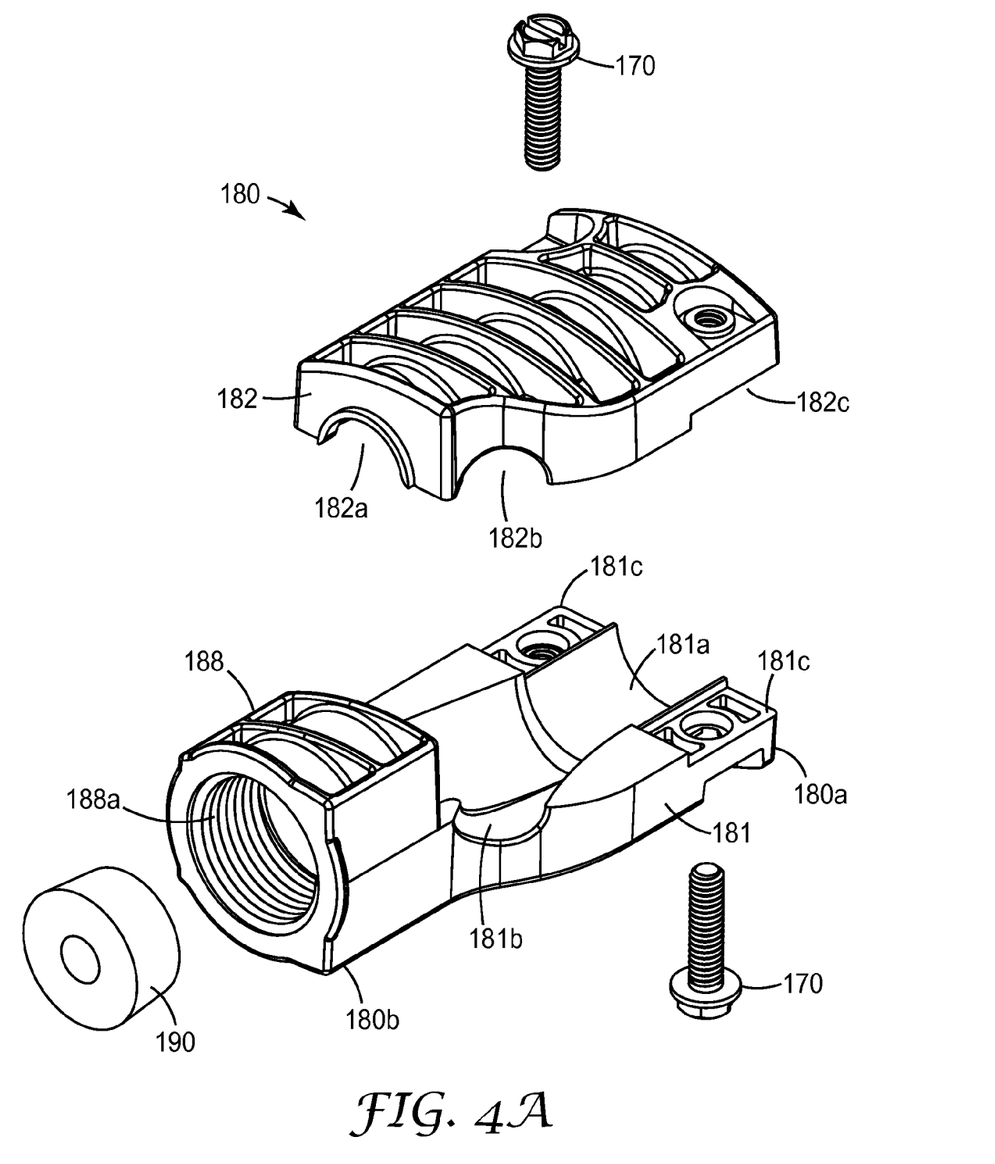
FIGS. 4A and 4B are two views of a break-out portion of the inlet device of FIGS. 3A-3C.
Figure 4B:
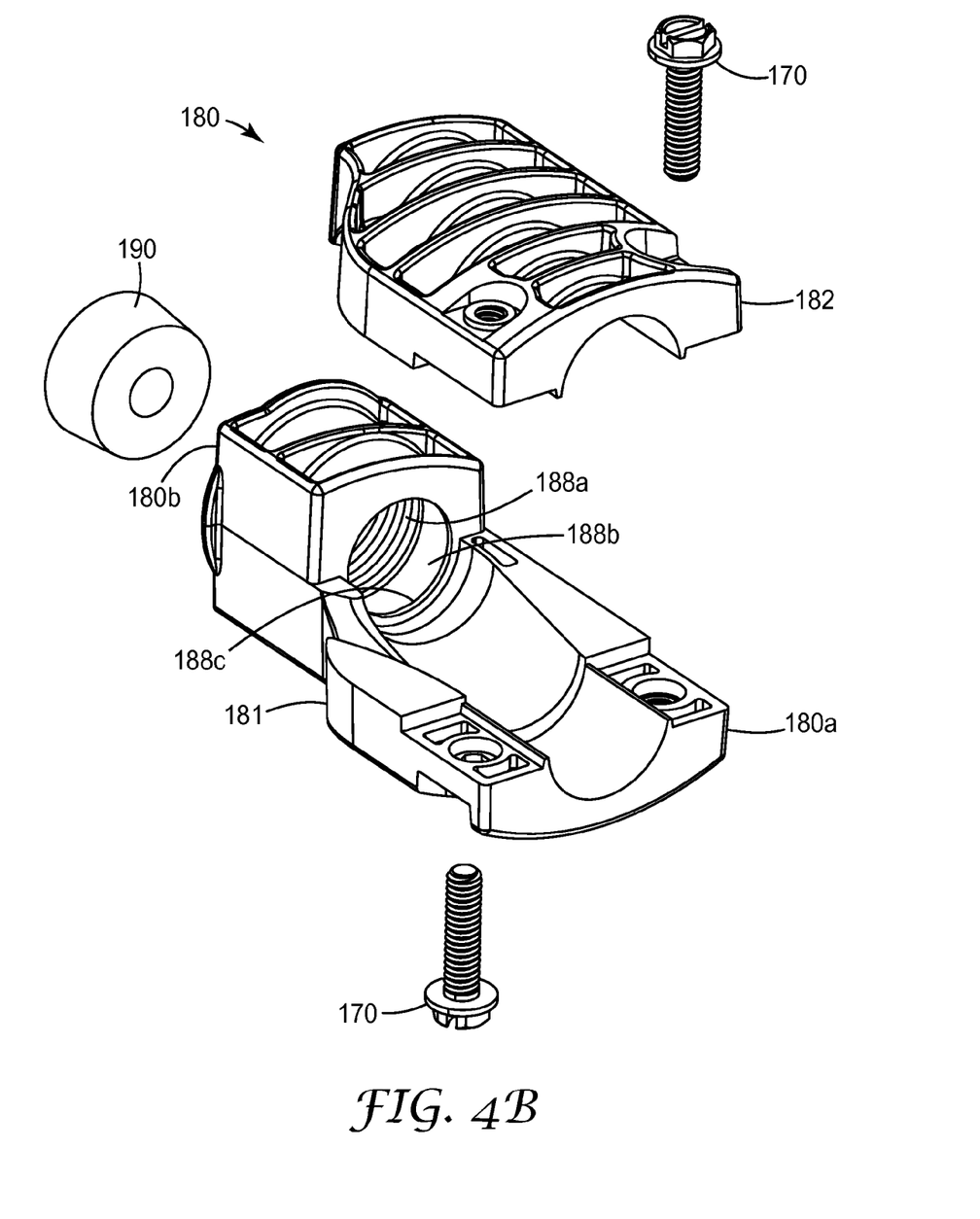

Break-out portion 180 is configured to attach to the terminal end of a protective conduit 80. Exemplary protective conduits can include smooth or ribbed plastic or metal tubing such as Carflex® Liquidtight Flexible Non-Metallic Conduit or Carflex® X-Flex™ Non-Metallic Mechanical Protection Tubing available from Thomas & Betts.

Break-out portion 180 includes a first body section 181 and a second body section 182. Break-out portion 180 includes a central channel running lengthwise from a first end 180a to a second end 180b of the first body section and conduit coupling disposed adjacent the second end of the first body section. In an alternative aspect the conduit coupling disposed on the second body section or can have a split design where one half of the conduit coupling is disposed on the first body section and the second half is disposed on the second body section. In FIGS. 4A and 4B, the central channel is semi-cylindrical channel that runs from the first end of the first body section to the conduit coupling. Of course the channel can have other geometries such as a generally elliptical or rectangular shape and is a matter of design choice. The conduit coupling 188 can include an internal thread 188a that is configured to mate with an external thread 86 of a piece of conventional conduit connection hardware 85. Alternatively the conduit coupling can include a smooth interior passage and have an exterior thread or other standard connection configuration such as a bayonet style connection.

Inlet device 100 can include a conduit sealing member 190 that is held within a chamfered section 188b of the conduit coupling such that it is compressed when conduit connection hardware 85 is secured to the conduit coupling to provide an environmental seal between the cables exiting the conduit and between the conduit and the inlet device. In an exemplary aspect, a stopping ledge 188c can be disposed around the base of the chamfered section to provide stop for the conduit sealing member so that it cannot be pushed too far into the breakout portion of the inlet device when the conduit connection hardware is secured to the conduit coupling.

In addition the first body section 181 of the break-out portion 180 can include one or more break-out channels 181b that joins with the central channel 181a at an oblique angle. FIGS. 4A and 4B show a break out portion having a single semi-cylindrical break out channel disposed between the central channel and the exterior surface of the first body portion. Electrical cable 45 can enter the breakout portion of the inlet device through the break out channel. In this exemplary aspect, electrical cable 45 will include two electrical conductors. If two separate single conductor electrical cables are used to service the remote radio unit, then a second break-out channel can be added to the design. The second break-out channel can be disposed on the same side of the main channel as break-out channel 181b or can be disposed on the opposite side of the main channel and is a matter of design choice.

In an alternative aspect, the exemplary inlet device can be utilized in a fiber to the home applications in which case a ruggedized drop cable or small secondary distribution cable can enter the inlet device through break-out channel 181b.

The second body section 182 can have a complementary structure to first body section 181. The second body section 182 can include a central channel 182a running lengthwise along of the second body section and one or more break-out channels 182b that joins with the central channel at an oblique angle. The central channels 181a, 182a and break-out channels 181b, 182b will form passages through the break-out portion 180 when the first and second body sections 181, 182, respectively, are secured together. In the exemplary embodiment shown in FIGS. 3C and 4A, the first and second body sections can be secured together via mechanical fasteners 170. The same mechanical fasteners can be used to secure the break-out portion to the compression nut 150. The longitudinal side tabs 159a can be positioned in connection depressions 181c, 182c formed in the first and second body sections such that the longitudinal side tabs sandwiched between the first and second body sections when the mechanical fasteners are used to secure the first and second body sections together.

In the exemplary inlet device shown in the figures, the break-out portion of the device is not sealed. Rather environmental sealing is provided by sealing member 140 as the cables enter the housing 110 of the device and by conduit sealing member 190 as the cables 40 exit conduit 80. In an alternative aspect, an additional gasket can be disposed in a channel formed around the perimeter of one of the first and second body sections to provide a higher level of environmental protection to the internal space defined by the body sections when they are in an assembled state.

While the inlet devices embodiments described above are generally described in a cell tower application, the exemplary inlet device may have utility FTTH or FTTA networks or in applications blown fiber applications.

Various modifications including extending the use of the inlet device to applications with copper telecommunication cables or copper coax cables, equivalent processes, as well as numerous structures to which the present invention may be applicable will be readily apparent to those of skill in the art to which the present invention is directed upon review of the present specification.

I claim:

1. An inlet device to be fitted to a communication cable, the device comprising:
   a housing having a first end and a second end, wherein the housing includes, a compression member attached to the second end of the housing and a break-out portion attached to the compression member, wherein the break-out portion includes a first body section and a second body section attachable to the first body section to create an internal space through which communication cables can be passed, wherein the break-out portion further comprises a conduit coupling disposed on one of the first body section and the second body section, and wherein the conduit coupling is configured for the attachment of a conduit to the inlet device.

2. The inlet device of claim 1, further comprising a retainer clip disposed in a channel adjacent to the first end of the housing to secure the inlet device in a close fitting port of a telecommunication enclosure.

3. The inlet device of claim 1, further comprising a sealing member at least partially inserted into the second end of the inlet device.

4. The inlet device of claim 3, wherein the compression member comprises a clamping nut and wherein the compression member is fitted over a collapsible portion that is adjacent to the second end of the housing causing the collapsible portion to conform to an outer surface of at least a portion of the sealing member.

5. The inlet device of claim 1, wherein conduit coupling includes an internal thread that is configured to mate with an external thread of a piece of conduit connection hardware that is mounted on the terminal end of a length of conduit.

6. The inlet device of claim 1, the inlet device further includes a conduit sealing member disposed within a chamfered section of the conduit coupling such that it is compressed when conduit connection hardware is secured to the conduit coupling, wherein the conduit sealing member provides an environmental seal between the cables exiting the conduit and between the conduit and the inlet device.

7. The inlet device of claim 1, wherein at least one of the first body section and the second body section includes a central channel extending lengthwise along the at least one of the first body section and the second body section.

8. The inlet device of claim 7, wherein the compression member includes a pair of longitudinal side tabs and wherein the break-out portion is attached to the compression member via the pair of longitudinal side tabs.

9. The inlet device of claim 1, wherein each of the first body section and the second body section includes a central channel extending lengthwise the first body section and the second body section, respectively.

10. An inlet device to be fitted to a communication cable, the device comprising:
a housing having a first end and a second end, wherein the housing includes, a compression member attached to the second end of the housing and a break-out portion attached to the compression member, wherein the break-out portion includes a first body section and a second body section attachable to the first body section to create an internal space through which communication cables can be passed, wherein at least one of the first body section and the second body section includes a central channel extending lengthwise along the at least one of the first body section and the second body section, and wherein the break-out portion further includes at least one break-out channel that joins to the central channel at an oblique angle.

11. An inlet device to be fitted to a communication cable, the device comprising:
a housing having a first end and a second end, wherein the housing includes, a compression member attached to the second end of the housing and a break-out portion attached to the compression member, wherein the break-out portion includes a first body section and a second body section attachable to the first body section to create an internal space through which communication cables can be passed, wherein at least one of the first body section and the second body section includes a central channel extending lengthwise along the at least one of the first body section and the second body section, and wherein the break-out portion further includes at least one break-out channel joined to the central channel at an oblique angle to accommodate an external cable to pass though the inlet device.

\* \* \* \* \*